US012181665B2

(12) United States Patent
Meyer et al.

(10) Patent No.: US 12,181,665 B2
(45) Date of Patent: Dec. 31, 2024

(54) METHOD FOR OPERATING SMART GLASSES INCLUDING A VIRTUAL RETINAL DISPLAY, PROCESSING UNIT, AND SMART GLASSES

(71) Applicant: Robert Bosch GmbH, Stuttgart (DE)

(72) Inventors: Johannes Meyer, Haseluenne (DE); Johannes Fischer, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/345,263

(22) Filed: Jun. 30, 2023

(65) Prior Publication Data

US 2024/0012239 A1 Jan. 11, 2024

(30) Foreign Application Priority Data

Jul. 11, 2022 (DE) ..................... 10 2022 207 025.9

(51) Int. Cl.
| | | |
|---|---|---|
| *G06F 3/01* | (2006.01) | |
| *G02B 27/00* | (2006.01) | |
| *G02B 27/01* | (2006.01) | |
| *G09G 1/00* | (2006.01) | |

(52) U.S. Cl.
CPC ....... *G02B 27/0093* (2013.01); *G02B 27/017* (2013.01); *G02B 27/0172* (2013.01); *G06F 3/013* (2013.01); *G02B 2027/0118* (2013.01); *G02B 2027/014* (2013.01); *G02B 2027/0141* (2013.01); *G02B 2027/0178* (2013.01)

(58) Field of Classification Search
CPC .............. G02B 27/0093; G02B 27/017; G02B 27/0172; G02B 2027/0118; G02B 2027/014; G02B 2027/0141; G02B 2027/0178; G06F 3/013

See application file for complete search history.

(56) References Cited

U.S. PATENT DOCUMENTS

| | | | |
|---|---|---|---|
| 2016/0124506 A1* | 5/2016 | Hwang | ................... G06F 3/017 |
| | | | 345/156 |
| 2016/0260206 A1* | 9/2016 | Jung | ...................... G06V 40/18 |
| 2017/0115483 A1 | 4/2017 | Aleem et al. | |
| 2019/0370450 A1* | 12/2019 | Fletcher | .............. G06V 40/197 |
| 2020/0074724 A1* | 3/2020 | Mathur | ............. G02B 27/0172 |
| 2022/0051642 A1* | 2/2022 | Flach | ....................... G09G 5/10 |

FOREIGN PATENT DOCUMENTS

| | | |
|---|---|---|
| CN | 114236834 A | 3/2022 |
| DE | 102018214637 A1 | 3/2020 |
| DE | 102020205937 A1 | 11/2021 |
| WO | 2005051181 A1 | 6/2005 |

* cited by examiner

*Primary Examiner* — Sanghyuk Park
(74) *Attorney, Agent, or Firm* — NORTON ROSE FULBRIGHT US LLP; Gerard A. Messina

(57) ABSTRACT

A method is provided for operating smart glasses including a virtual retinal display. In at least one method step, in particular a calibration step, a pupil size characteristic curve is generated in a user-specific manner in that a plurality of pupil sizes of a user eye are ascertained in the case of calibration images of different brightnesses generated by the virtual retinal display. In at least one further method step, at least one present pupil diameter of the user eye of the user of the smart glasses is determined using the pupil size characteristic curve.

9 Claims, 4 Drawing Sheets

METHOD FOR OPERATING SMART GLASSES INCLUDING A VIRTUAL RETINAL DISPLAY, PROCESSING UNIT, AND SMART GLASSES

CROSS REFERENCE

The present application claims the benefit under 35 U.S.C. § 119 of German Patent Application No. DE 10 2022 207 025.9 filed on Jul. 11, 2022, which is expressly incorporated herein by reference in its entirety.

BACKGROUND INFORMATION

In some conventional smart glasses systems, general brightness-to-pupil diameter curves are stored and a pupil diameter is thus estimated passively based on a presently measured ambient brightness.

SUMMARY

According to an example embodiment of the present invention, a method for operating smart glasses including a virtual retinal display (retinal scanning display) is provided. In at least one method step, in particular in at least one calibration step, a pupil size characteristic curve is generated in a user-specific manner in that a plurality of pupil sizes of a user eye, in particular at least two pupil sizes of the user eye, preferably at least three pupil sizes of the user eye, are ascertained in the case of calibration images generated by the virtual retinal display of different brightnesses, and in at least one further method step, at least one present pupil diameter of the user eye of the user of the smart glasses is determined using the pupil size characteristic curve. A robustness of a pupil detection may thus advantageously be significantly improved. A particularly precise pupil diameter curve may advantageously be obtained. A personalized pupil diameter curve may advantageously be obtained.

"Smart glasses" are to be understood in particular as a wearable (head-mounted display), with the aid of which pieces of information may be added to the field of vision of a user. Smart glasses preferably enable augmented reality and/or mixed reality applications. Smart glasses are also designated colloquially as smart glasses. In particular, the smart glasses include a virtual retinal display (VRD), also called a retinal scanning display (RSD). In particular, the virtual retinal display includes at least one (scanned) laser projector. In particular, the laser projector is provided to output the scanned laser beam to generate the image display, in particular the virtual retinal display. In particular, the laser beam output by the laser projector may include a further signal portion, which is invisible to a human eye and/or which is provided for tasks other than the image display. For example, this further signal portion of the scanned laser beam may be designed as an infrared laser signal. In particular, the scanned laser beam includes an infrared beam component. Pupil sizes, pupil positions, and/or pupil shapes are ascertainable from a reflection signal of the infrared beam component of the scanned laser beam, in particular utilizing the so-called bright pupil effect. The bright pupil effect advantageously generates a strong iris/pupil contrast, and thus enables a detection of the pupil sizes, pupil positions, and/or pupil shapes with all iris pigmentations. The bright pupil effect occurs in particular due to the phenomenon that the retina reflects an increased portion of incident light when its wavelength is in the (infrared) range of approximately 850 nm. "Provided" is to be understood in particular as specially programmed, designed, and/or equipped. An object being provided for a specific function is to be understood in particular to mean that the object fulfills and/or executes this specific function in at least one application and/or operating state.

According to an example embodiment of the present invention, the pupil size characteristic curve is designed in particular as a dependency between pupil size and brightness, in particular ambient brightness. The pupil size characteristic curve is generated in particular by a linear interpolation between the measuring points recorded in the method step, in particular the calibration step. Other fittings, in particular nonlinear fittings, are also possible, when a linear fitting does not appear to match in a case, in particular in the case of a person. In particular, at least a two-point calibration, preferably at least a three-point calibration, is carried out in the calibration step. In particular, the calibration step may be carried out separately for each user, so that advantageously a separate pupil size characteristic curve is ascertained for each user. This is advantageous in particular because there is no general correlation of brightness to pupil diameter for all eyes, and instead each person/each eye reacts differently to different brightnesses. The calibration images of different brightnesses may represent, for example, different white tones, in particular white tones of different brightnesses. In particular, the calibration step is carried out in darkness, for example, in a dark room, in order to avoid distortions due to the present ambient brightness. In particular, the user-specific pupil size characteristic curves ascertained in the calibration step are used for the determination of the present pupil diameter in regular operation of the smart glasses.

If the brightnesses of the calibration images are actively controlled by a laser projector of the virtual retinal display, a simple and/or reliable determination of the pupil size characteristic curves may advantageously be achieved. A closed-loop measurement, in particular a closed control loop, may advantageously be obtained between the set brightness in the laser projector and the ascertained pupil diameter.

If the brightnesses, in particular of the laser projector and/or the calibration images, are moreover measured by a detector for visible light integrated into a laser beam dump of the laser projector, a simple and/or reliable precise determination of the respective brightnesses may advantageously be achieved. In particular, the detector is designed as a photodiode. In particular, the same detector is also used to monitor a laser power of the laser projector. The laser beam dump is implemented in particular with the aid of a beam splitter (for example, a semitransparent mirror) introduced into the optical path of the laser projector. In particular, a part of the laser light is taken from the optical path of the laser projector. In particular, the laser beam dump may be necessary since it is not possible to operate a laser, for example a laser diode, of the laser projector at an arbitrarily low power, since otherwise the beam properties may change significantly. The laser, in particular the laser diode, may be operated at an optimal power value, for example, several hundreds of milliwatts, due to the laser beam dump, without all of the power always also reaching the user eye. Since the portion of the laser light that is redirected by the beam splitter is known, the brightness actually output at the user eye may be inferred by way of a measurement of the brightness in the laser beam dump. The control loop advantageous for the brightness-pupil size calibration may thus advantageously be provided. Alternatively, it is possible that the power of the laser of the laser projector is directly set precisely. The optical path of the laser projector, in particular of the visible laser light of the laser projector, is otherwise free of further sensors and/or detectors.

Moreover, according to an example embodiment of the present invention, it is provided that the pupil sizes of the user eye are measured by evaluating a reflection signal of an invisible, in particular infrared, scanned laser beam radiated into the user eye in addition to the calibration images, in particular by evaluation of the reflection signal generated by the bright pupil effect. A reliable, simple, and/or compact system for determining pupil sizes may thus advantageously be achieved.

Furthermore, according to an example embodiment of the present invention, it is provided that the pupil sizes are measured by an infrared detector integrated into a laser projector of the virtual retinal display. A reliable, simple, and/or compact system for determining pupil sizes may thus advantageously be achieved. In particular, the infrared detector is provided to detect the back reflection signals of the user eye. In particular, the infrared detector may be integrated into an infrared laser diode of the laser projector. In particular, the infrared laser of the laser projector and the infrared detector of the laser projector are combined in a VCESL (vertical-cavity surface-emitting laser) including integrated photodiode (ViP).

In addition, according to an example embodiment of the present invention, it is provided that in at least one further method step, the ascertained pupil size characteristic curves are stored in an internal or external memory unit, to which the smart glasses have access, in particular in such a way that the pupil size characteristic curves are retrievable at any time by the smart glasses. A reliable and/or rapid determination of the present pupil diameter, in particular based on a present brightness measurement, may thus advantageously be enabled. The memory unit may in particular be designed integrated into the smart glasses or may be stored in a cloud and/or a connected third device, for example, a smart phone etc.

In addition, according to an example embodiment of the present invention, it is provided that in at least one further method step, an ambient brightness is ascertained, in particular in the temporal context of the display of the calibration images. A particularly accurate determination of the pupil size may thus advantageously be enabled. In particular, an offset of the pupil size characteristic curves may thus be ascertained. The phrase "temporal context" is to be understood in particular as shortly (fractions of a second) before, shortly (fractions of a second) after, and/or during the display of the calibration images. In particular, the ambient brightness may be ascertained by a separate ambient brightness sensor of the smart glasses. However, the ambient brightness is preferably determined by the same detector (the detector integrated into the laser beam dump of the laser projector), which is also used for the active brightness control. In this case, the ambient brightness is measured immediately before and/or immediately after the display of the calibration images.

Moreover, according to an example embodiment of the present invention, it is provided that in at least one method step, an ambient brightness is determined from the present pupil diameter of the user eye ascertained via the user-specific pupil size characteristic curve together with a (present image) brightness ascertained presently by the detector for visible light integrated into the laser beam dump of the laser projector. A particularly simple ambient brightness determination may thus advantageously be enabled, which manages in particular without additional active sensor components. A complexity of the smart glasses may advantageously be kept low. In particular, the ambient brightness is ascertained from a difference between a brightness ascertained on the basis of the measured pupil size from the pupil size characteristic curve and the brightness measured by the detector integrated into the laser beam dump of the laser projector.

Furthermore, according to an example embodiment of the present invention, it is provided that in at least one method step, a distance, in particular a distance change, between the user eye and a glasses lens of the smart glasses is estimated and/or ascertained from the present pupil diameter of the user eye ascertained via the user-specific pupil size characteristic curve. A high level of user comfort may thus advantageously be achieved. For example, a distance change between user eye and glasses lens may advantageously be detected, so that the virtual retinal display may take countermeasures accordingly. In particular, the distance change may be ascertained from a difference of a pupil size to be expected at a specific brightness and the present pupil size actually measured at this brightness.

Furthermore, according to an example embodiment of the present invention, the smart glasses including the virtual retinal display (retinal scanning display) and a processing unit, which are provided for carrying out the above-described method, are provided. A robustness of a pupil detection may thus advantageously be significantly improved. A particularly precise pupil diameter curve may advantageously be obtained. A personalized pupil diameter curve may advantageously be obtained. A "processing unit" is to be understood in particular as a unit including an information input, an information processing, and an information output. The processing unit advantageously includes at least one processor, a memory, input and output means, further electrical components, an operating program, regulating routines, control routines, and/or computation routines. The components of the processing unit are preferably situated on a shared circuit board and/or advantageously situated in a shared housing, for example, inside the smart glasses. Alternatively, it is possible that the processing unit is stored, for example, in a cloud or in a smart phone, etc., and is provided for communication with the smart glasses, in particular at least with a controller of the laser projector.

The method according to the present invention and the smart glasses according to the present invention are not to be restricted in this case to the above-described application and specific embodiment. In particular, the method according to the present invention and the smart glasses according to the present invention may include a number of individual elements, components, and units as well as method steps deviating from a number mentioned herein to fulfill a functionality described herein. Moreover, in the case of value ranges specified in this disclosure, values lying within the mentioned limits are also to be considered to be disclosed and usable as desired.

BRIEF DESCRIPTION OF THE DRAWINGS

Further advantages of the present invention result from the following description of the figures. An exemplary embodiment of the present invention is shown in the figures. The figures and the description contain numerous features in combination. A person skilled in the art will expediently also consider the features individually and combine them to form reasonable further combinations.

DETAILED DESCRIPTION OF EXAMPLE EMBODIMENTS

Figure 1:
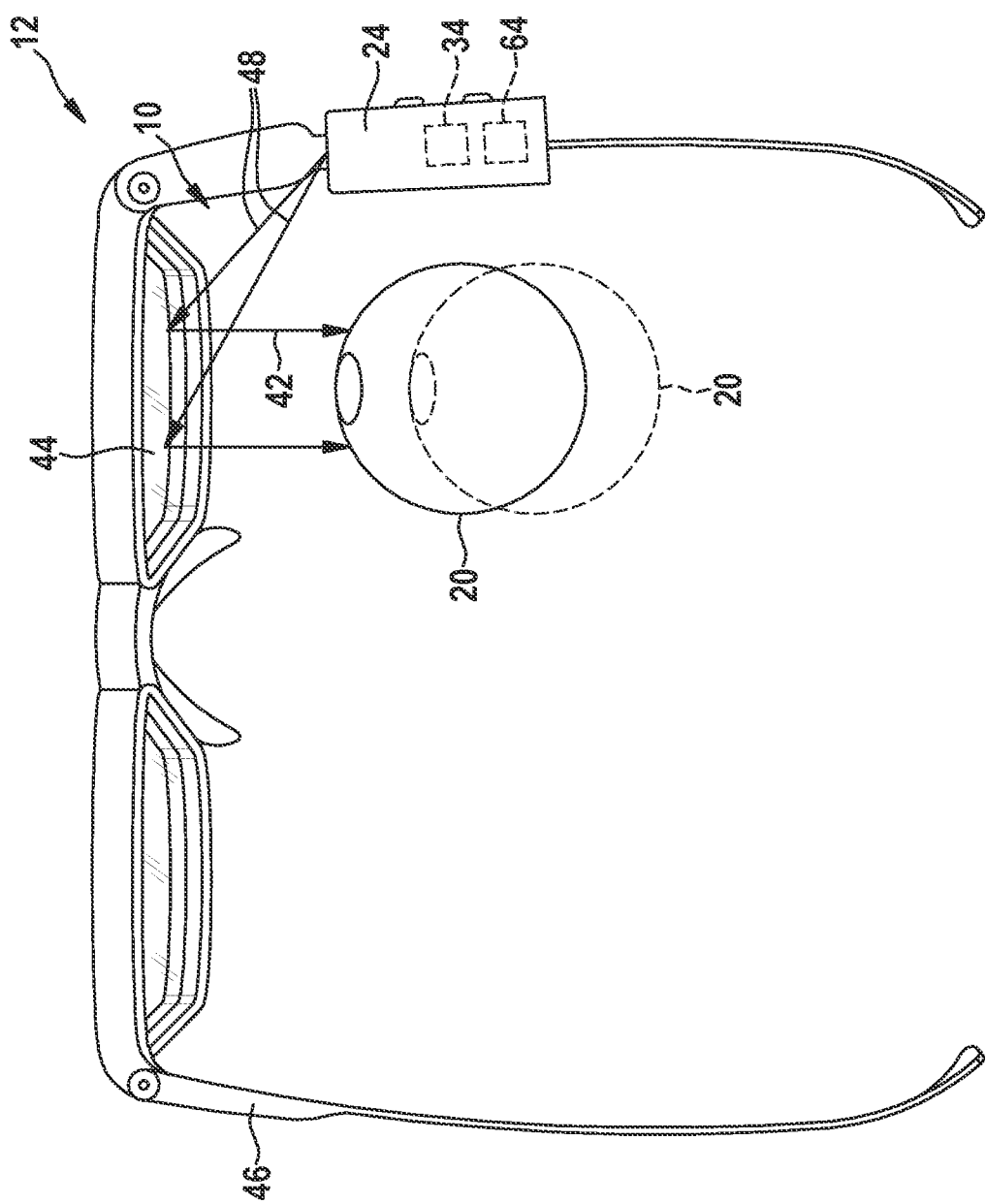
FIG. 1 shows a schematic representation of smart glasses according to an example embodiment of the present invention including a laser projector.

FIG. 1 shows a schematic representation of smart glasses 12. Smart glasses 12 include a virtual retinal display (retinal scanning display) 10. Smart glasses 12 include a glasses frame 46. Smart glasses 12 include glasses lenses 44. Smart glasses 12 are provided for determining pupil sizes, distances 42 between a user eye 20 and glasses lens 44, and ambient brightnesses. Two different positions of user eye 20 are shown by way of example in FIG. 1, which may occur, for example, due to slipping of smart glasses 12 on the nose of the user. Smart glasses 12 include a laser projector 24. Laser projector 24 is designed as a scanned laser projector. Laser projector 24 is provided to generate and output a scanned laser beam 48. Scanned laser beam 48 generates an image display of smart glasses 12. Scanned laser beam 48 may be provided for ascertaining a pupil position, pupil movement, pupil shape, and/or pupil size, for example, via the bright pupil effect. Scanned laser beam 48 includes a visible portion, which is provided to output an image at user eye 20. Scanned laser beam 48 is provided to output an image display directly onto a retina of user eye 20. Scanned laser beam 48 includes an infrared portion, which is provided at least for ascertaining the pupil position, pupil movement, pupil shape, and/or pupil size of user eye 20. Laser projector 24 is at least partially integrated into glasses frame 46. Smart glasses 12 include a memory unit 34. Alternatively, memory unit 34 could also be designed separately from smart glasses 12 and could have a communication connection to smart glasses 12 (for example, as a cloud or as an external smart phone, etc.). Memory unit 34 is provided at least for storing and providing pupil size characteristic curves 16 (cf. FIG. 4). One user-specific pupil size characteristic curve 16 may be stored per user of smart glasses 12. Moreover, it is possible that user-specific pupil size characteristic curves 16 determined once may be shared between various smart glasses 12. Smart glasses 12 include a processing unit 64. Processing unit 64 includes memory unit 34. Processing unit 64 is provided for executing an operating program of smart glasses 12, via which preferably at least a large part of the main functions of smart glasses 12 are executable. Processing unit 64 is provided for carrying out a method for operating smart glasses 12 including virtual retinal display 10 (cf. also FIG. 3).

Figure 2:
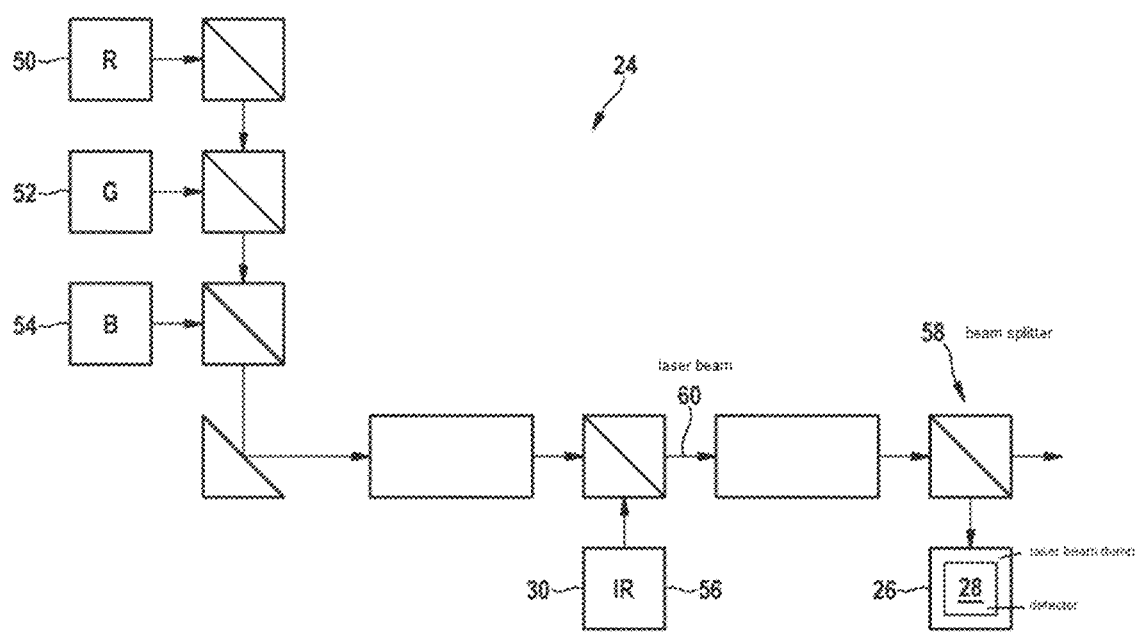
FIG. 2 schematically shows a structure of the laser projector according to an example embodiment of the present invention.

FIG. 2 shows schematically and in simplified form a structure of laser projector 24. Laser projector 24 includes a red laser source 50. Laser projector 24 includes a green laser source 52. Laser projector 24 includes a blue laser source 54. Laser projector 24 includes an infrared laser source 56. The light beams of red, green, blue, and infrared laser sources 50, 52, 54, 56 are unified in a laser beam 60. Laser projector 24 includes an infrared detector 30. Infrared detector 30 is integrated into infrared laser source 56. Laser projector 24 includes a laser beam dump 26. Laser beam dump 26 is provided for absorbing a part of unified laser beam 60. Laser projector 24 includes a beam splitter 58. Beam splitter 58 is provided to redirect a part of unified laser beam 60 to laser beam dump 26. Beam splitter 58 is provided to let a part of unified laser beam pass in the direction of user eye 20. Beam splitter 58 may be designed, for example, as a 50/50 beam splitter or as a 70/30 beam splitter. Laser projector 24 includes a detector 28 for visible light. Detector 28 for visible light forms a brightness detector. Detector 28 for visible light is provided for determining brightnesses of calibration images of virtual retinal display 10. Detector 28 for visible light is integrated into laser beam dump 26.

Figure 3:
FIG. 3 shows a schematic flowchart of a method for operating the smart glasses, according to an example embodiment of the present invention.

FIG. 3 shows a schematic flowchart of a method for operating smart glasses 12 including virtual retinal display 10. In at least one method step 14, forming a calibration step, pupil size characteristic curve 16 is generated in a user-specific manner. In method step 14, for generating user-specific pupil size characteristic curve 16, a plurality of pupil sizes of user eye are ascertained in the case of calibration images of different brightnesses generated by virtual retinal display 10. For this purpose, in method step 14, the brightnesses of the calibration images are actively controlled by laser projector 24 of virtual retinal display 10. The brightnesses of the calibration images are controlled with the aid of detector 28 for visible light integrated into laser beam dump 26 of laser projector 24, which measures the particular presently set brightnesses. Moreover, in method step 14, the pupil sizes of user eye 20 are measured by evaluating the reflection signal of the infrared part of scanned laser beam 48 radiated into user eye 20 in addition to the calibration images. The bright pupil effect is utilized for this purpose, which generates a significantly increased reflection of user eye 20 in the area of the pupil in relation to the area around the pupil with approximately perpendicular incident radiation of the infrared light. To ascertain the pupil sizes, in method step 14, the infrared light reflected back from user eye 20 is measured by infrared detector 30 integrated into laser projector 24. In particular, processing unit 64 is provided for carrying out the individual substeps of method step 14. In at least one further method step 36, an ambient brightness is ascertained in the temporal context with the display of the calibration images. An offset of pupil size characteristic curve 16 may thus be ascertained.

In at least one further method step 62, linear interpolation is carried out, in particular with the aid of processing unit 64, between the data points ascertained in above-mentioned method step 14 and pupil size characteristic curve 16 is thus created. In at least one further method step 32, ascertained pupil size characteristic curve 16 is stored in memory unit 34. Pupil size characteristic curve 16 generated and stored in this way is retrievable at any time by smart glasses 12, in particular by processing unit 64 of smart glasses 12. In at least one method step 66, test brightnesses are set by laser projector 24 and the pupil diameter measured at the test brightnesses is estimated using the value ascertained via pupil size characteristic curve 16. In the event of a good correspondence, pupil size characteristic curve 16 is verified. In the event of a poor correspondence, the calibration step has to be repeated or the interpolation method for obtaining pupil size characteristic curve 16 has to be adapted.

In at least one further method step 22, at least one present pupil diameter of user eye 20 of the user of smart glasses 12 is determined using pupil size characteristic curve 16.

In at least one method step 40, distance 42 between user eye 20 and glasses lens 44 of smart glasses 12 is estimated via the present pupil diameter of user eye 20 ascertained via user-specific pupil size characteristic curve 16. A change of distance 42 is ascertained from a difference of the pupil size to be expected at a specific brightness on the basis of pupil size characteristic curve 16 and the pupil size presently actually measured at this brightness by infrared detector 30.

In at least one method step 38, the ambient brightness is ascertained passively from a presently measured pupil diameter. The ambient brightness is determined from the present pupil diameter of user eye 20 ascertained via user-specific pupil size characteristic curve 16 together with the (present image) brightness ascertained presently by detector 28 for visible light integrated into laser beam dump 26 of laser projector 24. For this purpose, a difference brightness is determined between the brightness calculated on the basis of user-specific pupil size characteristic curve 16 for the measured pupil size and the brightness actually measured by detector 28 for visible light. This difference brightness then corresponds to the ambient brightness.

Figure 4:
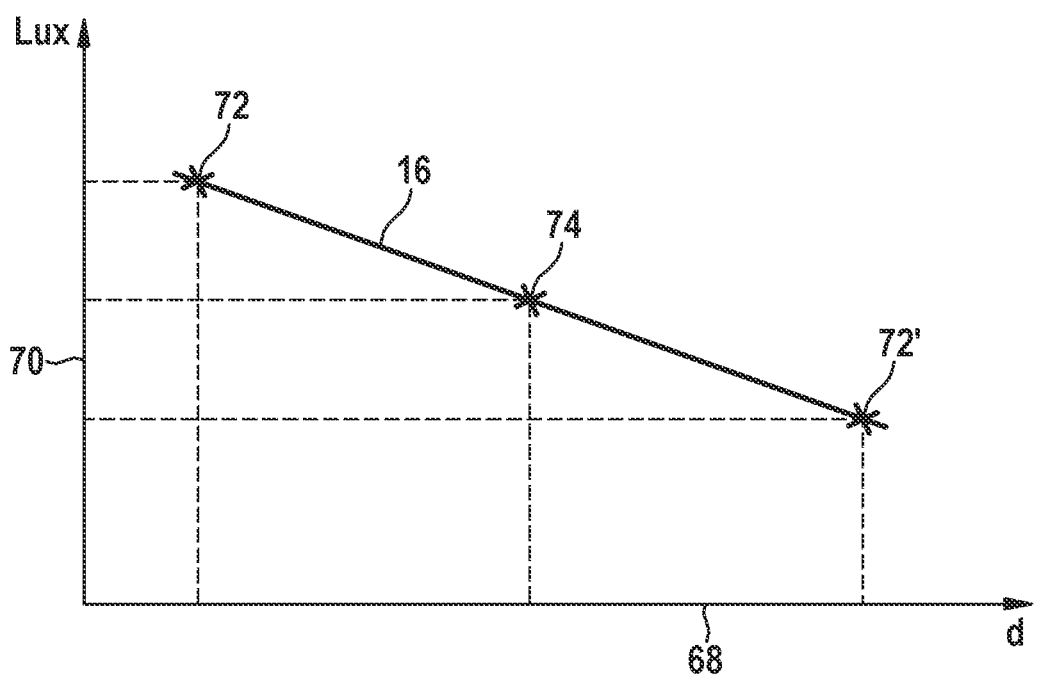
FIG. 4 shows an exemplary pupil size characteristic curve ascertained in the method, according to an example embodiment of the present invention.

FIG. 4 shows by way of example a diagram including a pupil size characteristic curve 16. A pupil size is plotted (as the pupil diameter) on an abscissa 68 of the diagram. A brightness in lux is plotted on an ordinate 70 of the diagram. Two measuring points 72, 72' for pupil sizes at specific brightnesses are plotted by way of example, which were obtained in method step 14 by applying the different brightnesses with the aid of virtual retinal display 10. Pupil size characteristic curve 16 was obtained by linear interpolation between the two measuring points 72, 72'. Pupil size characteristic curve 16 was obtained with the aid of a two-point calibration. The use of more than two calibration points is possible. In addition, a control value 74 at a test brightness is plotted by way of example. Pupil size characteristic curve 16 may be verified by the correspondence of the measured pupil size at the test brightness with that from pupil size characteristic curve 16. To ascertain a pupil size from pupil size characteristic curve 16, in method step 22, only the particular value of pupil size characteristic curve 16 at a specific measured brightness value is sought out.

What is claimed is:

1. A method for operating smart glasses including a virtual retinal display, the method comprising the following steps:
    generating a pupil size characteristic curve in a user-specific manner in that a plurality of pupil sizes of a user eye of the user are ascertained based on calibration images of different brightnesses generated by the virtual retinal display;
    determining at least one present pupil diameter of the user eye of the user of the smart glasses using the pupil size characteristic curve;
    ascertaining an ambient brightness in a temporal context with a display of the calibration images; and
    determining an ambient brightness from the present pupil diameter of the user ascertained using the user-specific pupil size characteristic curve together with a present image brightness ascertained presently by a detector for visible light integrated into a laser beam dump of the laser projector.

2. The method as recited in claim 1, wherein the brightnesses of the calibration images are actively controlled by a laser projector of the virtual retinal display.

3. The method as recited in claim 2, wherein the brightnesses are measured by the detector for visible light integrated into the laser beam dump of the laser projector.

4. The method as recited in claim 1, wherein the pupil sizes of the user eye are measured by evaluating a reflection signal of an infrared scanned laser beam radiated into the user eye in addition to the calibration images.

5. The method as recited in claim 4, wherein the pupil sizes are measured by an infrared detector integrated into a laser projector of the virtual retinal display.

6. The method as recited in claim 1, further comprising:
    storing the ascertained pupil size characteristic curves in an internal or external memory unit to which the smart glasses have access in such a way that the pupil size characteristic curves are retrievable at any time by the smart glasses.

7. The method as recited in claim 1, further comprising:
    estimating and/or ascertaining a distance between the user eye and a glasses lens of the smart glasses from the present pupil diameter of the user eye ascertained using the user-specific pupil size characteristic curve.

8. A processing unit configured to operate smart glasses including a virtual retinal display, the processing unit configured to:
    generate a pupil size characteristic curve in a user-specific manner in that a plurality of pupil sizes of a user eye of the user are ascertained based on calibration images of different brightnesses generated by the virtual retinal display;
    determine at least one present pupil diameter of the user eye of the user of the smart glasses using the pupil size characteristic curve;
    ascertain an ambient brightness in a temporal context with a display of the calibration images; and
    determine an ambient brightness from the present pupil diameter of the user ascertained using the user-specific pupil size characteristic curve together with a present image brightness ascertained presently by a detector for visible light integrated into a laser beam dump of the laser projector.

9. Smart glasses, comprising:
    a virtual retinal display; and
    a processing unit configured to operate the smart glasses, the processing unit configured to:
        generate a pupil size characteristic curve in a user-specific manner in that a plurality of pupil sizes of a user eye of the user are ascertained based on calibration images of different brightnesses generated by the virtual retinal display,
        determine at least one present pupil diameter of the user eye of the user of the smart glasses using the pupil size characteristic curve;
        ascertain an ambient brightness in a temporal context with a display of the calibration images; and
        determine an ambient brightness from the present pupil diameter of the user ascertained using the user-specific pupil size characteristic curve together with a present image brightness ascertained presently by a detector for visible light integrated into a laser beam dump of the laser projector.

* * * * *